Jan. 12, 1971 H. BERNSTEIN 3,555,466

CAPACITIVE-INDUCTIVE NETWORK

Filed July 21, 1967

INVENTOR.
HOWARD BERNSTEIN

BY

OSTROLENK, FABER, GERB & SOFFEN
ATTORNEYS

United States Patent Office
3,555,466
Patented Jan. 12, 1971

3,555,466
CAPACITIVE-INDUCTIVE NETWORK

Howard Bernstein, New York, N.Y., assignor to Bel Fuse Inc., Jersey City, N.J., a corporation of New Jersey Filed July 21, 1967, Ser. No. 655,207
Int. Cl. H03h 7/10
U.S. Cl. 333—76 3 Claims

ABSTRACT OF THE DISCLOSURE

A miniaturized space-saving capacitive-inductive network including a toroidal support of non-conductive material on the opposite sides of which is disposed a pair of metallicized surfaces, which, together with the toroidal support function as a capacitor. A conductor is wound through the central aperture of the toroidal support and about the ring portion thereof to simultaneously function as an inductor. By electrically connecting one of the pair of metallicized surfaces to the conductor of the inductor a lumped capacitance may be provided.

This invention relates to electrical components, and more particularly to miniaturized capacitive-inductive networks utilizing a non-conductive support means both as the dielectric for a capacitor and the form upon which an inductive coil may be wound.

The present day requirements of electronic circuits have imposed a continuing requirement of volume decrease upon electronic equipment, which has been steadily met primarily by the decrease in size of electronic components and the utilization of printed circuits. Capacitive-inductive electrical networks, such as filters, pulse-shaping networks, delay lines and similar articles have, for the most part, used the combination of separate inductive and capacitive elements to provide the characteristics desired. Besides the relatively large size of the resultant combination, the requirement of separate elements has adversely affected the cost of manufacture and handling which have become of utmost importance in the production of miniaturized components.

The prior art has suggested one possible way of combining capacitive and inductive characteristics into a single integrated package, but has done so in such a manner as to require a relatively complex and expensive process of manufacture therefor.

Specifically, in the United States Pat. 2,937,348 to O. A. Ness, issued May 17, 1960, there is shown a capacitor-inductor combination in which a toroidal core is provided, about which is placed an inductive winding. To provide the capacitive function, the winding defines the first electrode of a capacitor. The dielectric for the capacitor is provided by a film of non-conductive material provided on the exterior of the inductive winding with a continuous layer of a reduction semi-conductor being disposed on the outside of the dielectric film. The second electrode of the capacitor is formed by an inner layer of graphite and an outer layer of sprayed metal disposed on the semi-conductor layer. It may be appreciated that although a capacitor-inductor combination is provided, the cost and complexity of manufacture thereof more than offsets the space-saving reduction in size resulting therefrom.

In contradistinction to the prior art, the instant invention provides a miniaturized capacitive-inductive network which is of utmost simplicity and therefore inexpensive to manufacture. Specifically, in the instant invention, a support form of insulating material provides a dual function in that (1) in combination with a pair of metallicized surfaces on the opposite sides thereof, it functions as the dielectric for a capacitor, and at the same time (2) functions as the form upon which an inductive coil may be wound. Furthermore, and as will be seen in greater detail, by a simple modification of the basic invention, the distributive nature of the capacitor thus formed may be easily converted to provide a lumped capacitance.

As a further feature of the instant invention it may be appreciated that the parameters of the capacitive-inductive network of the instant invention may be easily varied by simple substitution of materials. Thus, where a greater inductance is required a ferrite or powdered iron toroid may be used, and similarly where a greater capacitance is required ceramics with higher dielectric constants may be used for the toroidal support member.

Accordingly, it is an object of the instant invention to provide a capacitive-inductive network of utmost simplicity and minimum cost.

Another object of the instant invention is to provide a capacitive-inductive network which is defined by a single component package which thereby reduces volumetric requirements.

Still another object of the instant invention is to provide such a capacitive-inductive network which utilizes an insulative support form both in the formation of a capacitor and in the formation of an inductor.

Yet another object of the instant invention is to provide such a capacitive-inductive network which includes an insulative support on the opposite sides of which are disposed a pair of metallicized surfaces to define a capacitor, and which further utilizes the insulative support as the form about which the conductor of an inductive coil may be wound.

Still another object of the instant invention is to provide such a capacitive-inductive network which is of such a nature as to permit the formation of either a distributive or lumped capacitive parameter.

Yet another object of the instant invention is to provide such a capacitive-inductive network, the parameter of which may be easily varied by the simple choice of materials for the support form thereof.

Other objects and a fuller understanding of the instant invention may be had by referring to the following description and drawings, in which.

Figure 1:
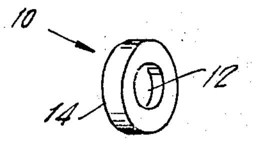
FIG. 1 is a perspective view of an insulative toroidal support member utilized in the instant invention.

Referring to FIG. 1, there is shown a support member 10 of insulative material. Preferably, the support member 10 is constructed in the toroidal shape shown so as to include a central aperture 12 and the ring portion 14. It is to be understood however that the instant invention is not to be limited to such toroidal shape since it will become apparent to those skilled in the art that the combined capacitive-inductive network formed on the support member 10 may be similarly based upon a support member having other configurations. The support member 10 may be constructed of any suitable insulating material such as glass, ceramic, etc., dependent upon the capacitance desired for the capacitor eventually defined thereon. Similarly, it might be constructed of a mixture of non-conductive material and a ferrite or powdered iron, dependent, as will be further explained, on the desired inductance of the inductor which will be formed thereon.

Figure 2:
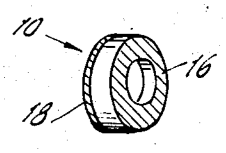
FIG. 2 is a perspective view of the toroidal form of FIG. 1 provided with a pair of metallicized surfaces on opposite sides thereof to define a capacitor.

Turning to FIG. 2, the support member 10 is provided with a pair of metallicized surfaces 16 and 18 on opposite sides thereof such that the structure defined in FIG. 2 now defines a capacitor. The metallicized surfaces are preferably deposited, such as by silver, copper or other form of conductor painted thereon, or could be etched after suitable vacuum depositing. Next, the metallicized surfaces 16 and 18 are preferably insulated by a coating of varnish (not shown).

Figure 3:
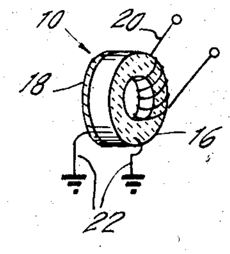
FIG. 3 is a view of the toroidal support form of FIG. 2 provided with a winding thereon to form an inductor.
Figure 3A:
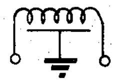
FIG. 3A is a schematic circuit diagram of the structure of FIG. 3.

In FIG. 3, a conductor 20 has been wound about the ring portion 14 of the support member 10 and thus adds an inductive coil to the already defined capacitor. Furthermore, it may be appreciated from the circuit diagram of FIG. 3A that by grounding both of the metallic surfaces 16 and 18, a distributed line is formed since both the capacitance and the inductance are evenly between the terminals coupled to conductor 20 distributed. In the distributed construction the winding forms one plate of the capacitor.

Figure 4:
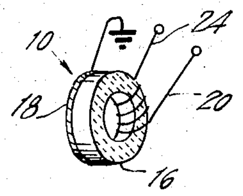
FIG. 4 is a view of the capacitive-inductive network of FIG. 3, modified to provide a lumped capacitance.
Figure 4A:
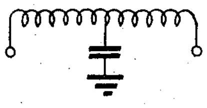
FIG. 4A is a schematic circuit diagram of the structure of FIG. 4.

As indicated in FIGS. 4 and 4A, by grounding one conductive surface such as 18, as indicated at 24, it is possible to define a lumped capacitance since in this embodiment the inductance and capacitance will not be evenly distributed but "lumped."

Figure 5:
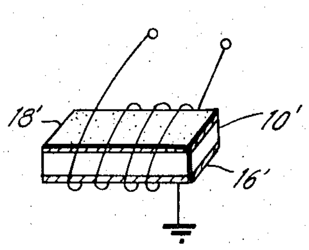
FIG. 5 is a perspective view of an alternative embodiment of the instant invention.

As indicated previously, by changing the materials of the support form 10, the parameters of the capacitor and inductor can be easily varied. Thus a glass or ceramic support member would provide higher dielectric for the capacitor while the use of a partially metallic support member such as powdered iron or ferrite would increase the inductance of the coil. Similarly, and as indicated previously, FIG. 5 shows an alternative embodiment wherein the support member 10' takes a shape other than the toroidal shape illustrated in FIGS. 1–4.

Thus there has been described a capacitive-inductive network of reduced size made possible by the dual utilization of the support member 10 as a dielectric for a capacitor and also the form upon which a conductor may be wound to form an inductive coil.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A capacitive-inductive network comprising:

a support means of toroidal shape defining a ring having oppositely facing parallel sides and a central aperture therethrough;

a pair of metallicized conductive surface means individually provided on said oppositely facing sides of said support means and cooperating therewith to function as a capacitor when connected within an electrical circuit; and conductor means insulatingly wound around said conductive surface means, and also continuously wound through said aperture of said support means and cooperating therewith to function as an inductive coil when electrically connected in circuit;

said support means serving as the dielectric for the capacitor so provided when cooperating with said conductive surface means and being selected of an insulative material exhibiting such dielectric constant as in accordance with the value of capacitance desired;

said support means also serving as the form upon which said conductor means is wound when cooperating therewith to provide said inductive coil, and being selected with a magnetic composition impregnation to increase the inductance exhibited by said coil as in accordance with the value of inductance desired.

2. The capacitive-inductive network of claim 1 wherein said magnetic composition is selected to be one of a ferrite or a powdered iron composition.

3. The capacitive-inductive network of claim 1 wherein said support means is selected of a ceramic material exhibiting a high dielectric constant.

References Cited

UNITED STATES PATENTS

| | | | |
|---|---|---|---|
| 2,890,422 | 6/1959 | Schlicke | 333—77 |
| 2,937,348 | 5/1966 | Ness | 333—79 |
| 3,002,136 | 9/1961 | Garstang | 333—79 |
| 2,973,490 | 2/1961 | Schlichte | 333—79 |
| 2,648,823 | 8/1953 | Kock | 332—4 |
| 2,759,155 | 8/1956 | Hackenberg | 333—79 |
| 3,076,947 | 2/1963 | Davidson | 333—79 |
| 2,464,377 | 3/1949 | Cohen | 333—79 |

HERMAN K. SAALBACH, Primary Examiner

C. BARAFF, Assistant Examiner

U.S. Cl. X.R.

333—29, 70, 79